Aug. 23, 1932.  C. W. GREEN  1,873,759
CASH REGISTER
Filed Oct. 1, 1926   7 Sheets-Sheet 1
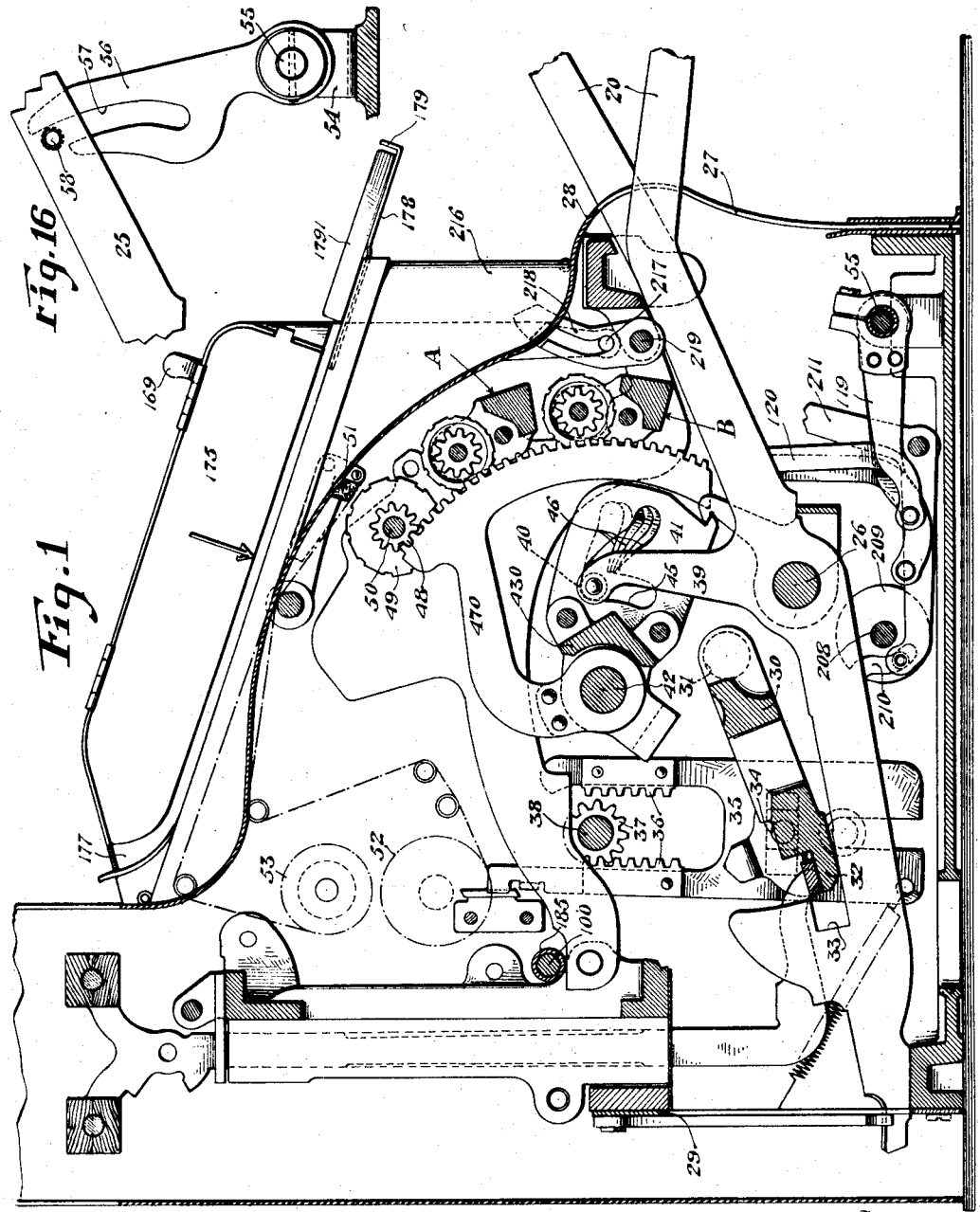
Inventor
Charles W. Green
By
Attorneys

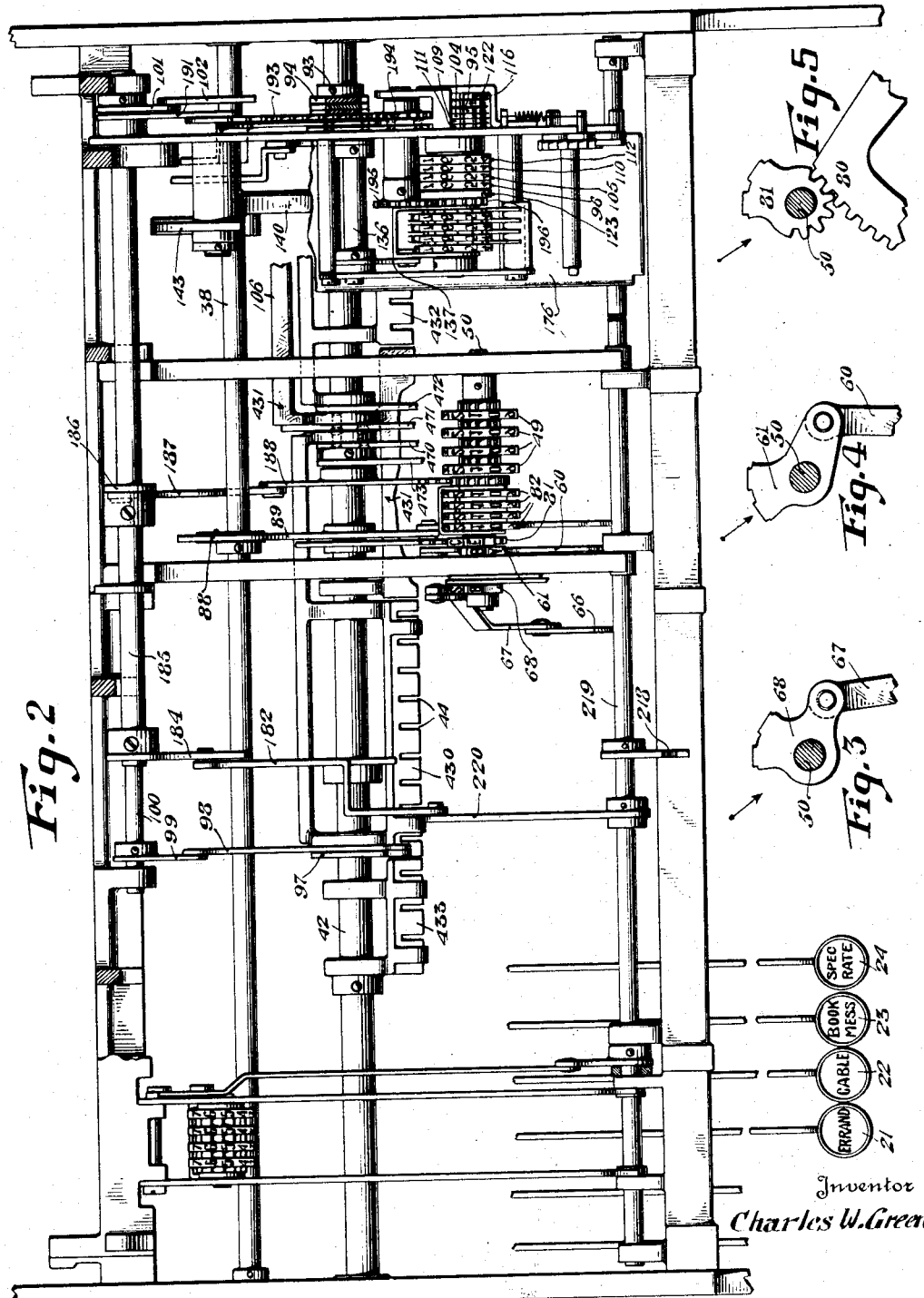

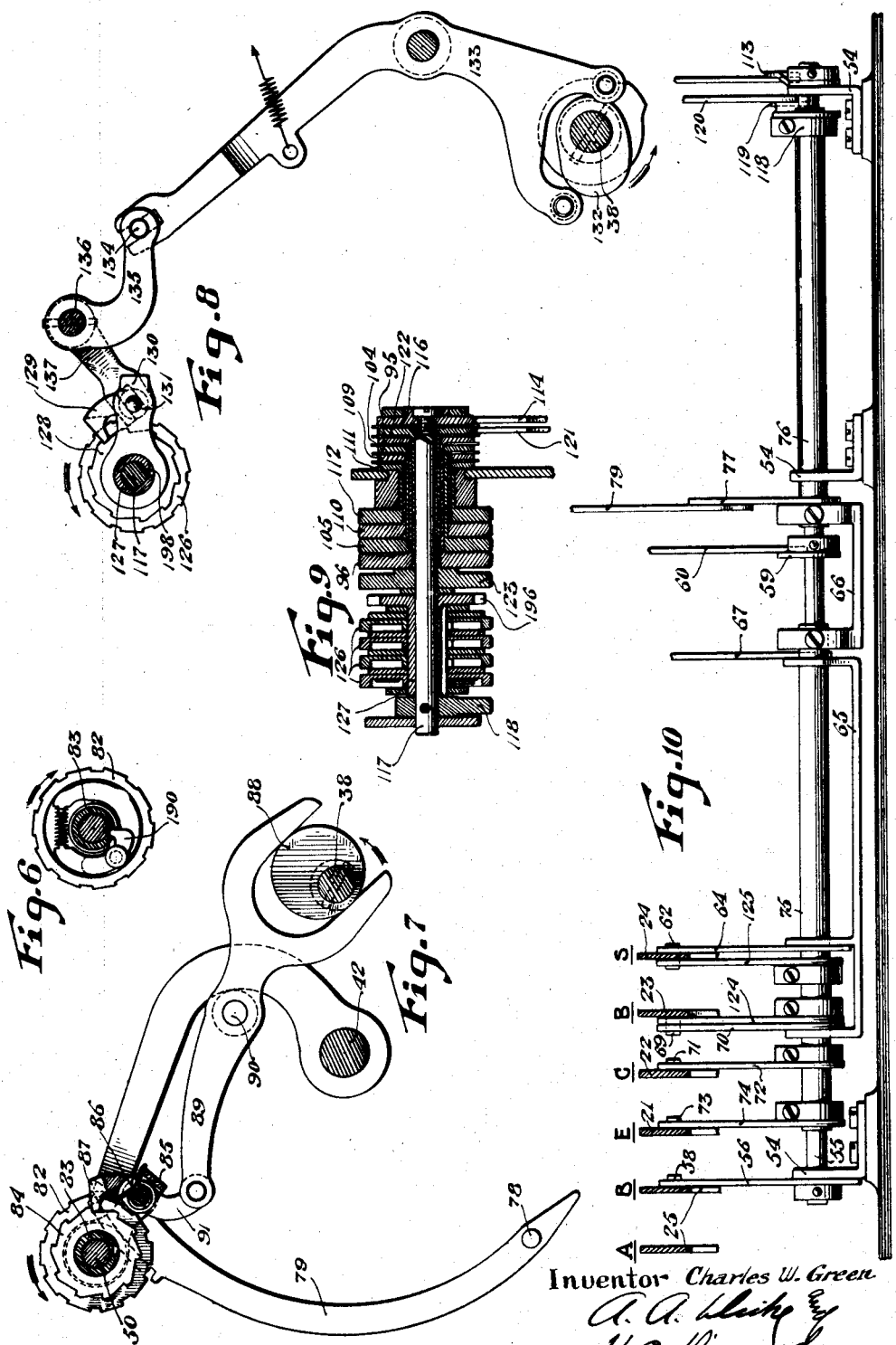

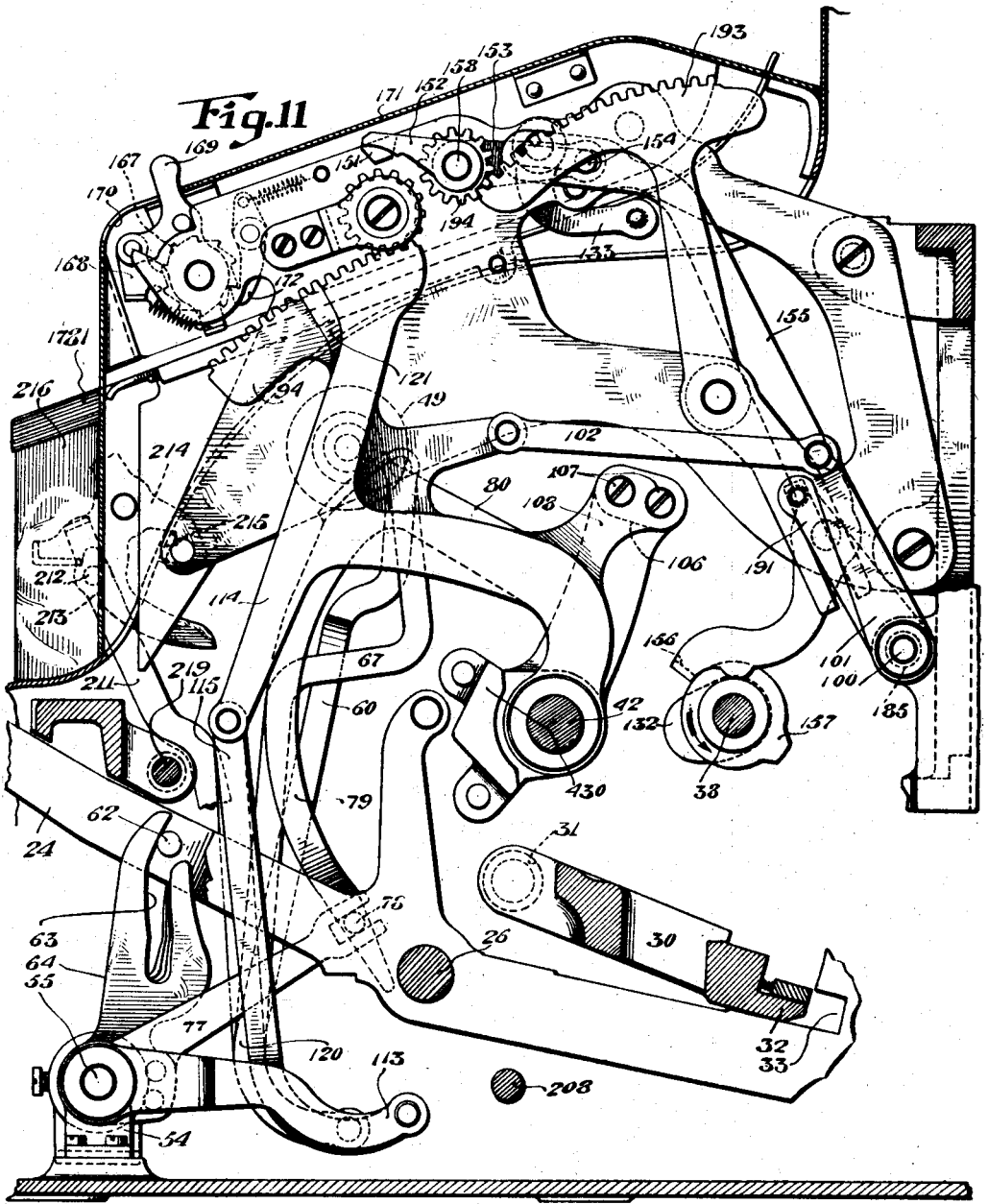
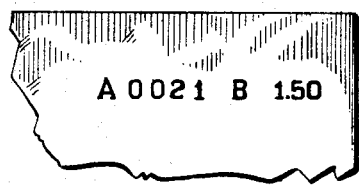

Aug. 23, 1932.  C. W. GREEN  1,873,759
CASH REGISTER
Filed Oct. 1, 1926  7 Sheets-Sheet 5
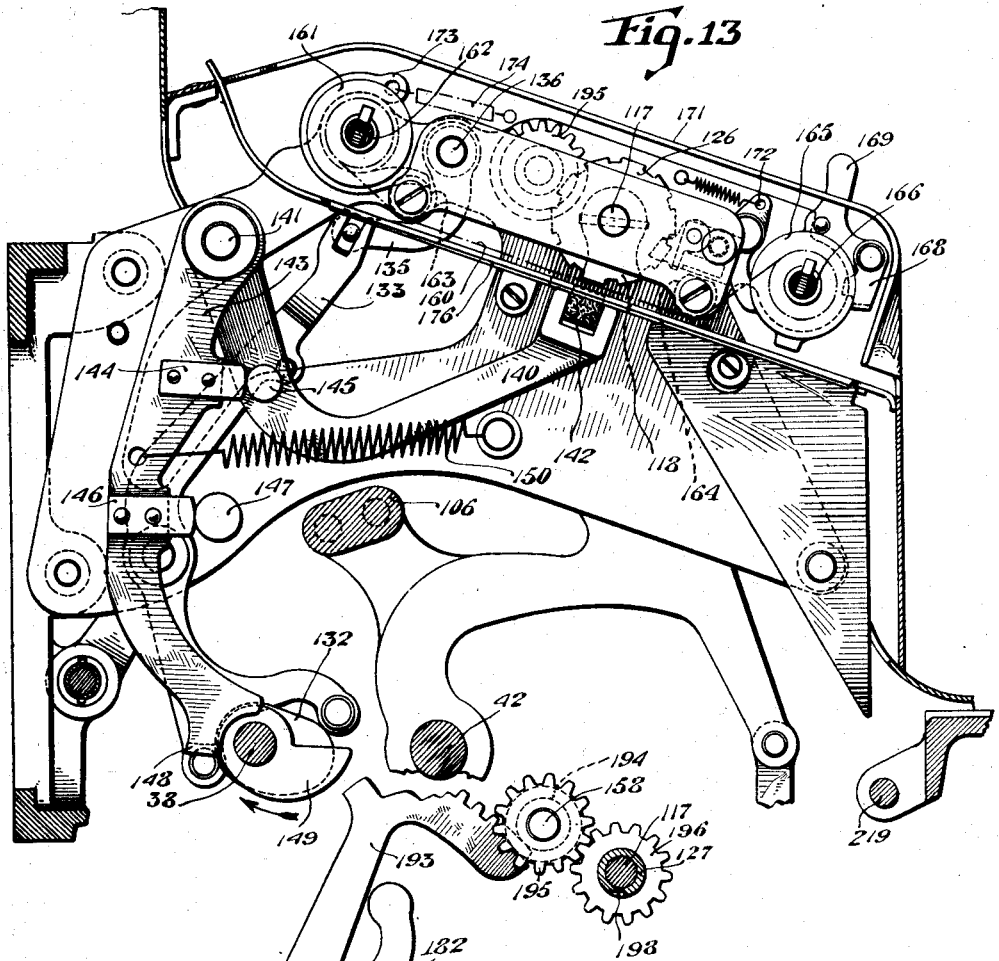
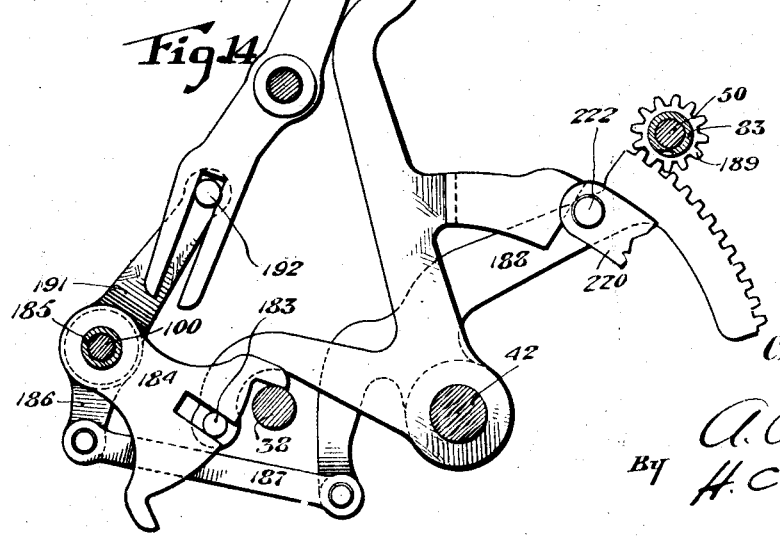
Inventor
Charles W. Green
By [signatures]
Attorneys

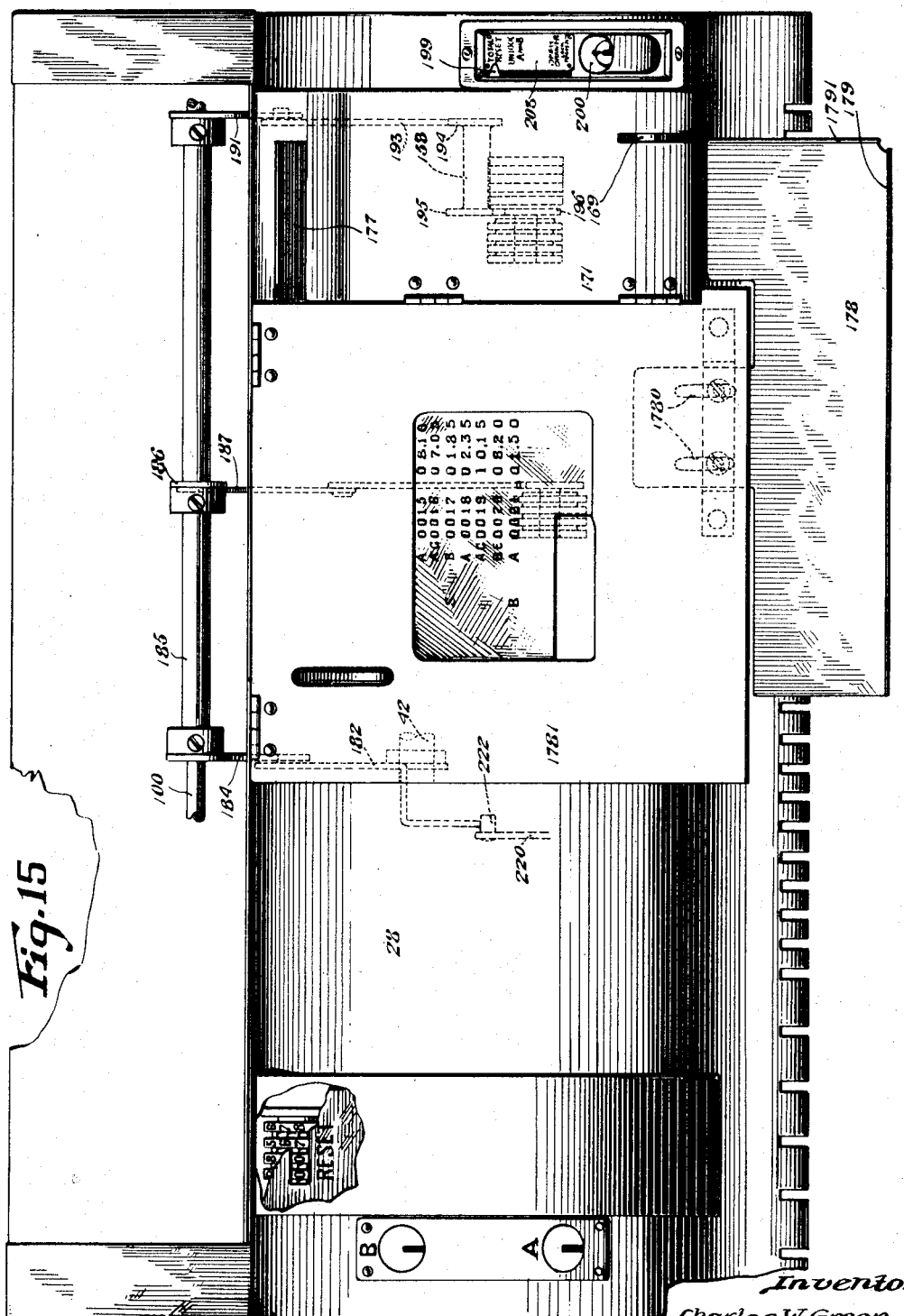

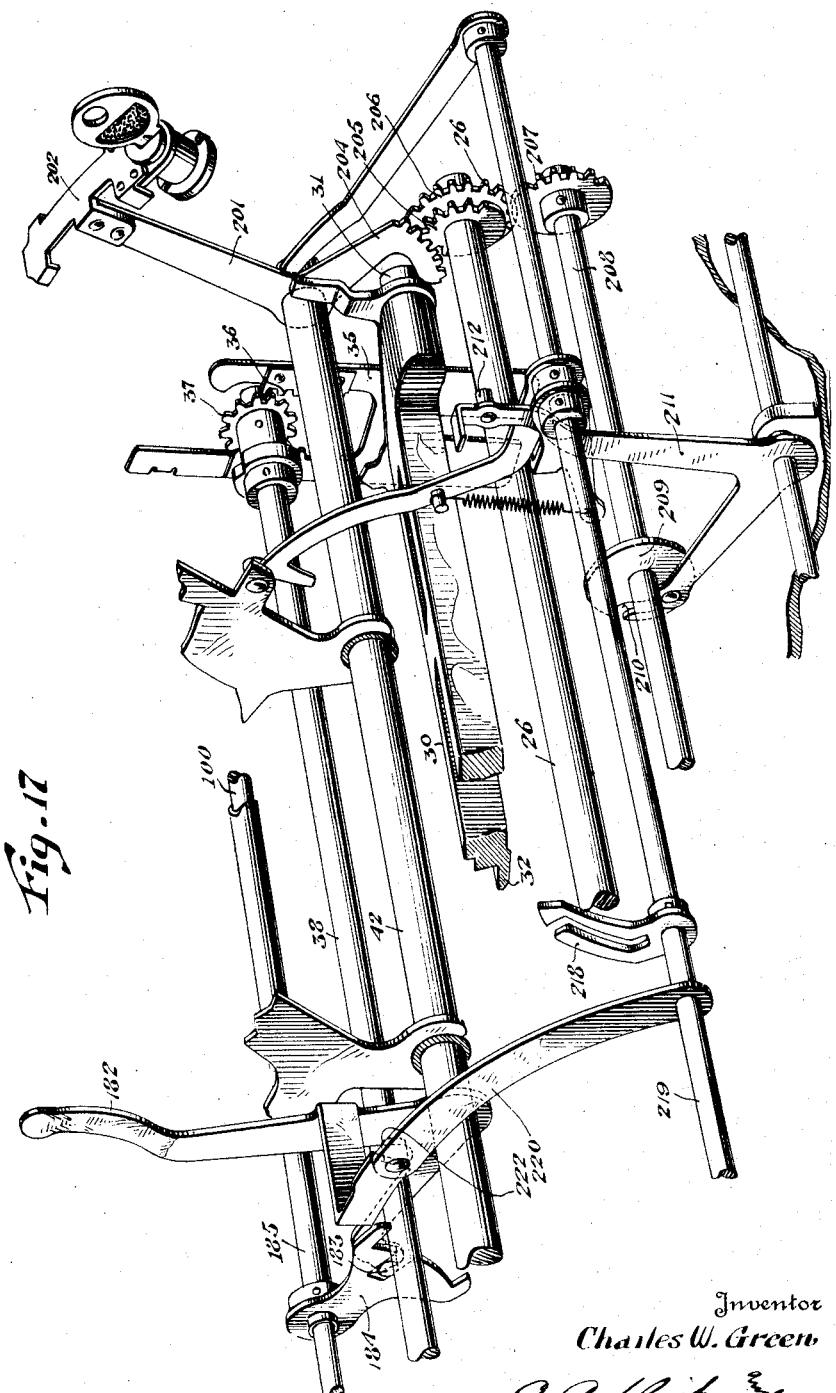

Patented Aug. 23, 1932

1,873,759

UNITED STATES PATENT OFFICE

CHARLES W. GREEN, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed October 1, 1926. Serial No. 138,868.

This invention relates generally to improvements in cash registers and has particular reference to improvements in the printing mechanisms for such machines.

In the accompanying drawings the improvements are shown applied to a machine of the same general type as is shown and described in the U. S. application Ser. No. 263,125 filed November 19, 1918 by Frederick L. Fuller (now Patent 1,742,701, January 7, 1930) and British Patents #135,465; 140,363; 157,823; 157,824; and 157,825 of July 11, 1921 illustrating the same machine. However, as will be more clearly apparent from a reading of this specification the improvements are capable of being applied to or embodied in a number of other forms of cash registers and accounting machines without departing from the spirit of the invention.

A primary object of the invention is to provide a printing mechanism for printing upon a record strip the items entered in the machine together with identifying characters, and to print the same information upon a slip inserted in the machine and to so construct this mechanism as to adapt it for use particularly in connection with telegraph offices and the like.

The broad features of the invention as a whole may find application in many ways and may be embodied in widely different forms of structures. In order to better explain the invention and its various phases there will be described one embodiment thereof which has been worked out in practice and which represents the preferred design from a commercial viewpoint.

The functions of the improved machine will now be described it being assumed that the machine is to be used in a telegraph office, this line of business being taken merely as an example since it will be readily understood that the same type of machine is adapted for use in any analogous business and it is not intended to limit its application to the line of business with which it is described herein.

It has been the usual practice of clerks located in the various telegraph offices to determine the number of words in the message written out and tendered by the customer or patron, and to enter the number of words upon the written message and after the charges have been determined to deposit the money received from the patron or customer in a suitable cash till. The clerk under this system then usually assigns a consecutive number to the message, checks the number of words, enters the amount of the message, designates the type of message and then places upon the sheet an initial assigned to the particular clerk taking the telegram. This information, in duplicate, is also placed upon the sheet known as the "counter" sheet. The written message is then passed through a time stamp and forwarded to the operating room to be transmitted. After the messages have been transmitted they are sent to the bookkeeping department and in order to prevent any fraudulent operations or withholding of any revenue from the company each message is checked against the "counter" sheet.

It will be readily understood that unscrupulous or dishonest employees may practice fraud in many ways, by raising or lowering the written figures and in fact by tampering with the records in many other ways which will result in their being accountable for less cash than that actually received. By the present improvements the amounts of the various telegrams as received are printed both upon a record strip contained in the machine and upon the telegram which is inserted in a suitable opening in the casing. In addition to this, certain other identifying characters are printed upon both record mediums to suitably identify the clerk entering the transaction as well as to indicate the nature of the transaction itself, that is, whether the message is a straight telegram or of the types known as a "Cable" or "Book" message, or one receiving a special rate such as a "Night" or "Day" letter. Each of the items, as printed upon the record strip, is consecutively numbered and a corresponding number is also printed upon the inserted telegram. Since the impressions upon the record mediums are indelible they cannot be changed without fear of detection thereby eliminating to a great extent the possibility of frauds which may be practiced when the figures are penciled.

It is the practice of telegraph companies to receive and transmit messages known as "Book" messages which means simply that a single message may be sent to different persons. By the present improvements transactions involving messages of this kind are readily handled and information pertaining to this type of transaction is readily distinguishable from that relating to other types of transactions. The telegram which contains the message to be sent is inserted in the machine and the total charges for sending that message to the different addresses is printed in one corner, it being understood that the record strip and the telegram receives the same consecutive number. After this operation the sheet which contains the addresses to which the same message is to be sent is inserted in the printing mechanism and adjacent each address there is printed the amount charged for sending each individual message.

Since the address sheet is usually of a greater length than the telegram the slip printer hood is so designed and arranged that sheets of any length may be readily inserted and stepped along as the various items are successively printed upon the address sheet.

Messages of the types designated as "Book" messages and "Special Rate" occur less frequently than the others and since it is desirous to obtain in some manner means whereby transactions of this nature may readily be picked out on the record strip contained in the machine, the present invention includes a novel form of differential mechanism whereby a common type carrier for printing the identifying characters may be utilized in connection with printing upon an inserted slip or telegram, whereas a plurality of type carriers may be provided for the record strip printing mechanism. The last mentioned type carriers are separated so that the identifying characters designating "Book" messages and "Special Rate" messages are printed in a distinctive manner and separate from the characters identifying the other types of transactions.

The consecutive numbering counters of the present machine are arranged to consecutively number the items entered in the machine during any arbitrary period and also include devices whereby by a simple operation of a lever both consecutive numbering devices will be zeroized simultaneosuly so that the items pertaining to a subsequent period of business may readily be numbered.

With the foregoing and other objects in view the invention consists in certain novel features of construction and combination of parts, which are pointed out in the appended claims, and a preferred form of embodiment of which is shown in the accompanying drawings.

Of said drawings:

Fig. 1 is a transverse sectional view of the register taken for the purposes of illustrating the present improvements, this view showing particularly the differential mechanism, for adjusting the type carriers and actuating the totalizers and the devices utilized for driving the main rotation shaft.

Fig. 2 is a top plan view of the machine, the cabinet and other parts being removed to show more clearly other parts. This view shows particularly the arrangement of the differential devices and their cooperation with the duplex printing mechanisms.

Figs. 3, 4 and 5 are detail views of the special character printing members.

Fig. 6 is a cross sectional view through one of the consecutive numbering counters showing the relationship between the type carriers and the related turnback pawls.

Fig. 7 is a cross sectional view through the consecutive numbering counter for the record strip printer showing the operating means therefor.

Fig. 8 is a view illustrating in detail the operating devices for the consecutive numbering type carriers associated with the slip printing mechanism.

Fig. 9 is a cross sectional view of the assembly of type carriers associated with the slip printing mechanism.

Fig. 10 is a detail view in front elevation illustrating the differential mechanisms utilized for the purpose of adjusting the special type printing members.

Fig. 11 is a view in side elevation partly in section taken at the right hand side of the machine showing the assembly of the adjusting racks for setting the various type elements and shows the relationship of the slip printing mechanism to the machine as a whole.

Fig. 12 is an example of the printing performed on an inserted slip by the slip printing mechanism.

Fig. 13 is a view in side elevation partly in section of the slip printing mechanism, taken on the opposite side to that shown in Fig. 11, and shows in detail the percussion hammer for obtaining imprints upon the inserted slip.

Fig. 14 is a view in side elevation showing the resetting lever and connections for simultaneously resetting both consecutive numbering counters.

Fig. 15 is a top plan view of a portion of the machine with the cabinet attached showing particularly how printing appears upon the record strip.

Fig. 16 is a detail view in side elevation showing a portion of one of the clerk's keys and the controlling means for adjusting the associated type carrier to represent the clerk's key operated.

Fig. 17 is a perspective view of certain parts of the machine, including the locking devices operated by the control lever.

As shown in the drawings the machine used to illustrate one embodiment of the invention is of the key-operated type, that is, one in which the various functions, such as, indicating, registering and printing are effected directly by operation of the keys. Addition of the present improvements does not materially affect the operation of such a machine in the performance of these functions, but when keys are operated the additional type carriers which form a part of the new mechanism are also adjusted to represent the keys depressed and impressions are then taken from these type carriers upon an inserted slip.

Prior to depressing the keys the slip is inserted in a slot in the cabinet of the machine and then the keys representing the clerk operating the machine, the amount of the transaction and the type of transaction, are depressed, so that characters representing these keys may be printed both upon the record strip and the inserted slip. After the items are printed upon the slip the latter is simply withdrawn from the machine. A consecutive number is printed adjacent each item upon the record strip which corresponds with the consecutive number printed upon the slip which has been inserted in the machine to receive the same imprint.

To afford a convenient means of holding the inserted slips while the keys are being operated the machine is equipped with a platform on which the slips may be placed. The slip printing mechanism also includes an inking ribbon which may be manually fed whenever the printing impressions become faint.

The general organization and operation of the mechanism as a whole having been thus outlined the preferred construction of the various parts above referred to will now be described more in detail.

Keyboard

The illustrative machine is provided with a plurality of amount of registering keys which are divided into different denominational groups. Some of the amount keys are shown in Fig. 1 and are designated by reference character 20. There are also as best shown in Fig. 2, four special keys 21, 22, 23 and 24 which are respectively designated as "Errand," "Cable," "Book Message" and "Special Rate" and these are provided for denoting the type of transaction entered in the machine. The remaining group comprises two keys which are situated at the left of the keyboard and are known as clerk's or classification keys. These are shown in Fig. 10 and are designated by reference character 25.

The amount, clerk's and special keys are all pivoted upon a shaft 26 (Fig. 1) extending transversely of the machine. The operating keys are guided in their reciprocating movements by slots 27 formed in the front part of the cabinet 28 and are guided at their rear ends by slots formed in a vertical plate 29 attached to the rear framework of the machine.

Resting upon the rear ends of the keys is a key coupler 30 journaled at 31 between the side frames of the machine. The key coupler 30 has a flange or nose 32 co-operating at times with notches 33 formed in the rear ends of the keys. When the outer ends of the keys are depressed the key coupler 30 is rocked clockwise, as viewed in Fig. 1, and the nose 32 enters the notches 33 formed in the rear ends of the keys. The purpose of such key coupler mechanism is well known in the art and need not be discussed herein in detail.

Connected to the key coupler at 34 is a rack plate 35 provided with oppositely facing rack teeth 36 which alternately mesh with a gear 37 fast to a main operating shaft 38 journaled between the main side frames of the machine. The arrangement of this mechanism is such that a reciprocation of the key coupler 30 will effect a complete rotation of the gear 37 and the shaft 38 to which the gear is secured. The shaft 38 is designated as the main operating shaft since it is given a complete rotation at each operation of the machine, and it carries cams and other devices for operating various parts of the registering and printing mechanism.

Differential mechanism for record strip type carriers

The differential mechanisms or devices controlled by the various groups of keys are all similar in construction and principle and a description of one will suffice for all.

Referring more particularly to Fig. 1, reference character 20 designates one of the amount keys related to the dollars denominational group of keys. Each of the amount keys 20 is provided with an upwardly extending arm 39 carrying at its extreme upward end a roller 40 co-operating with a slot 46 formed in one of a series of cam plates 41. As shown in Fig. 2, loosely mounted upon a transverse shaft 42 is a frame 430 provided with a series of spaced slots 44 in which is secured the series of cam plates 41 one for each key. As shown in Fig. 1, the cam plates 41 are provided with L-shaped slots 45 and 46, the slots 45 being concentric with respect to the shaft 42. The slots 46 however, are graduated so that when the roller 40 carried by the arm 39 of a depressed key plays in the slot 46 of its associated cam plate it will move the frame 430 and attached parts differentially and to an amount corresponding to the value of the key depressed. When, however, the frame 430 is operated by the depression of a key 39 the rollers 40 of the undepressed keys will play in the arcuate slots 45 of the respective cam plates 41 permitting the frame 430 to be raised differentially without interfering with the rollers 40 of the unoperated keys. As shown in Fig. 1 the differential frame 430 has attached thereto a segmental rack 470. In continuous mesh with the segmental rack 470 is a pinion 48 attached to an item type carrier 49 mounted on a shaft 50 and adapted to print upon a record strip of the type associated with the printing mechanism shown in the Fuller application and British patents already identified.

It is to be understood that a differential mechanism is provided for each denominational group of keys in order that the operating keys of the different banks may adjust their associated differential type carriers a commensurate amount so that when the printing mechanism is operated the amount represented by the depressed keys in all of the banks will be printed upon the record strip contained in the machine.

Fig. 2 shows the arrangement of the various differential frames and particularly the way in which the various segmental racks are centralized. A differential frame 431 similar to frame 430 is provided for the dimes bank of keys and this frame has attached thereto at substantially one end an associated segmental rack 471. The cents differential frame which is just to the right of the dimes frame 431 is designated by reference character 432 and has attached thereto its associated segmental rack 472. The differential frame 433 associated with the tens of dollars group of keys is pinned directly to the shaft 42, while adjacent the segmental rack 470 associated with the dollars differential frame, there is connected to the shaft 42 a segmental rack 473. In this manner the different segmental racks are grouped together so as to actuate their associated item type carriers which are arranged similarly.

The record strip printing mechanism in the present application is indicated generally in Fig. 1 and comprises a printing platen 51 which is adapted to print upon a record strip withdrawn from the supply roller 52 and wound upon a storage roll 53, it being understood that an inking mechanism and a paper feeding mechanism are also incorporated so that after the items are printed they may be suitably spaced on the record strip. For further details regarding the construction of this mechanism reference may be had to the Fuller application and British patents before mentioned.

Situated below the type carriers are two totalizers (Fig. 1) designated by the reference letters "A" and "B". The pinions of these totalizers are adapted to be brought into mesh at the proper time with the teeth of the different segmental racks. The operation of each totalizer is controlled by its corresponding clerk's or classification key. Since the totalizer engaging mechanism forms no part of the present invention, it is not shown or described in the present application. A showing and description thereof may be found in the Fuller application and British patents above mentioned.

It is considered desirable to designate upon the record strip which clerk's key has been operated during the successive item entering operations in order to indicate in which totalizer the amount has been inserted. In order to provide for this there is journaled in brackets 54 (Fig. 10) attached to the base plate of the machine a shaft 55 which has attached thereto a cam plate 56 formed with a cam slot 57 (Fig. 16) co-operating with a stud 58 carried by the "B" key 25. At substantially the mid-portion of the shaft 55 (Fig. 10) there is secured a rearwardly extending arm 59 to which is connected a link 60 (Figs. 4 and 11) the upper end of which link is attached to a downward extension of a printing segment 61 which carries upon its periphery the type elements "A" and "B". As best shown in Fig. 4 the type carrier 61 is loosely mounted upon the shaft 50 and is so adjusted that it will normally print the letter "A", but whenever the "B" key is depressed the stud 58 co-acting with the cam slot 57 will rock the cam plate 56 thereby rocking the shaft 55 and through the connections just described will adjust the type segment 61 to a position where it will print the letter "B" upon the record strip.

The illustrative machine as suggested hereinbefore has four special or transaction keys designated as "Errand," "Cable," "Book Message" and "Special Rate" and in order to designate upon the record strip the types of transaction entered in the machine there is provided a plurality of type carriers which are adapted to print upon the record strip in different columns so that transactions of certain kinds may be readily selected and picked out. To accomplish this a novel form of differential mechanism is associated with these type carriers and it will now be described in detail. The "Special Rate" key 24 (as best shown in Fig. 10) carries a pin 62 extending through the key lever, one end of the stud co-operating with a cam slot 63 (Fig. 11) formed in a cam plate 64 which is attached to a bail member 65 (Fig. 10). One end of the bail extends rearwardly to form an arm to which is connected a link 67 (see Figs. 3 and 11) the upper end of which is attached to a downward extension of a segment 68 loosely mounted upon the shaft 50 and carrying on its periphery the type elements "B" and "S".

The "Book Message" key 23 (referring to Fig. 10) is also provided with a pin 69 working in a cam slot formed in a cam plate 70 which is attached to the bail member 65. The cam slots formed in the cam members 64 and 70 are dissimilar so that a differential movement may be imparted to the bail 65 and link 67 to differentially adjust the type printing segment 68 but their mode of operation is substantially the same. As best shown in Figs. 2 and 3 a blank portion of the segment is normally presented to the printing point (designated by the arrow in Fig. 3) so that in an operation of the machine not requiring a depression of any of the special keys 23 or 24 no special character will be printed adjacent the printed amounts this being clearly illustrated in Fig. 15. However, when either the "Book Message" or "Special Rate" key is depressed in item entering operations the printing segment 68 will be differentially adjusted so as to print either of the special characters "B" or "S" in line with the printed item but as shown in Fig. 15 at some distance to the left of the printed amount and the clerk's identifying character "A" or "B", in order that transactions of this kind may be readily picked out on inspection of the printed record strip.

As shown in Fig. 10 the special key 22 designated as the "Cable" key is provided with a pin 71 working in a cam slot formed in a cam plate 72 while the special key 21 designated as the "Errand" key is provided with a similar pin 73 working in a cam slot formed in a cam plate 74. The slots in the cam plates 72 and 74 differ from each other as do the slots formed in the cam plates 64 and 70 previously mentioned, and each of the cam plates 72 and 74 is securely clamped and attached to a sleeve 75 surrounding the shaft 55. The sleeve 75 is connected to an axially aligned sleeve 76 by means of a connecting bail member 66 the sleeve 76 having attached thereto a rearwardly extending arm 77 (see Fig. 11) which is bifurcated at its rearward end to engage a pin 78 attached to the downward extension 79 of a type segment rack 80 loosely mounted upon the shaft 42. As shown in Fig. 5 the segment 80 co-operates with teeth formed on the lower end of a type printing segment 81 which carries the printing characters "E" and "C". The inclinations of the cam slots formed in the cam plates 72 and 74 are such that when one of the associated keys is depressed it will adjust the type printing segment 81 to such a position as to print the corresponding character "E" or "C", it being understood that a blank portion is normally presented to the printing line designated by the arrow in Fig. 5 so that if neither of the keys 21 or 22 is depressed during item entering operations no imprint will be made upon the record strip by the type printing segment 81. As will be noted in Fig. 2 the printing segment 81 is located adjacent the printing segment 61 adapted to print the characters "A" and "B" so that the characters "E" or "C" may be printed adjacent thereto as shown particularly in Fig. 15.

*Consecutive numbering type carriers for record strip*

It is advantageous to consecutively number the items entered in the machine and to this end there is provided in axial alignment with the item printing type carriers 49 a series of four consecutive numbering type carriers 82 (Figs. 2 and 7). These type carriers and the mechanism for operating them are of the usual deep notch transfer type well known in the art and shown in many patents, one of which is the patent to Thomas Carney, #876,295 dated January 7, 1908. Encircling the shaft 50 is a sleeve 83 (Fig. 7) on which are loosely mounted the consecutive numbering type carriers 82 each of which has attached thereto a ratchet wheel 84. Loose upon the sleeve 83 is a bail 85 which carries a pivot pin 86 for the multi-tined operating and carrying pawl 87 co-operating with the ratchet wheels 84.

For operating the bail and pawl the following mechanism is employed. The shaft 38 carries an eccentrically mounted disk 88 which engages the bifurcation of a bell-crank 89 pivoted at 90 to a portion of the framework of the machine. The rearward arm of the bell-crank is connected to the pivot pin 86 by means of a link 91. From the above, it will be evident that during each operation of the machine the shaft 38 through the cam disk 88 will oscillate the bell-crank 89 and through the link 91 will reciprocate the bail 85 so that the operating pawl 87 will add a unit to the consecutive numbering type carriers.

*Slip printing mechanism*

In addition to having a recording mechanism for printing the amounts and identifying characters upon a record strip retained within the machine of the type (shown fully in the application Serial No. 263,125 and the British patents heretofore mentioned) as well as being provided with means by which the items recorded on the strip are consecutively numbered the register shown herein is provided with a suitable printing mechanism for printing the same information upon an inserted slip. The machine, therefore, affords complete information regarding each transaction entered in the machine both upon the retained record strip and the inserted slip or telegram. A sample of the work performed by the slip printer is shown in Fig. 12 in which it is seen that the type carriers for the slip printer must be adapted for printing amounts, a transaction character, a clerk's identifying character and a consecutive number.

Differential mechanism for slip type carriers

The connections between the differential frames and the type carriers associated with the slip printing mechanism will now be described.

Attached to the shaft 42 by means of a pin 93 (Fig. 2) is a segment 94 (Fig. 11) the teeth of which are adapted to engage a pinion 95 (Fig. 9) which is connected by a tube to a type carrier 96 for printing tens of dollars amounts upon the inserted slip.

The connections between the differentially actuated frame 430 related to the dollars keys and the type carrier for printing the dollars amounts upon the inserted slip comprises an upwardly extending arm 97 (Fig. 2) pinned to the left hand end of the dollars differential frame 430. The arm 97 is connected by a link 98 to a forwardly extending arm 99 which is pinned to a shaft 100 carried by the rear framework of the machine. The shaft 100 has attached thereto toward the right hand end an arm 101, similar to the arm 99, which is connected to the dollars actuating segment 103 by means of a link 102 (Fig. 11). The segment 103 is loosely mounted upon the shaft 42 and the teeth of the segment mesh with a pinion 104 which is connected by a tube to a type carrier 105 for printing characters to represent the dollars amounts.

The frame 431 associated with the dimes bank of keys has an integral portion 106 (Figs. 2 and 13) to which is attached by a pair of screws 107 (Fig. 11) an actuating segment 108 which is loosely mounted upon the shaft 42 and adapted to co-operate with the teeth of a pinion 109 which is connected by a sleeve to a type carrier 110 for printing characters representing the 10¢ to 90¢ amounts.

The actuating segment for the type carrier for printing the characters 1¢ to 9¢ upon the inserted slip is not shown in detail in the present application, but comprises an actuating segment which is directly attached to the cents differential frame 432, the actuating segment being in alignment and in mesh with a pinion 111 (Figs. 2 and 9) which is connected by a sleeve to the type carrier 112 for printing the characters 1¢ to 9¢ upon the inserted slip.

From the foregoing it will be clear that the differential movements of any of the frames will impart a similar movement to the associated type carriers through the related actuating segments so that when the type carriers for printing the amounts upon the record strip are adjusted, the type carriers associated with the slip printing mechanism will be correspondingly adjusted and the same data will be printed upon the different record mediums.

As shown in Fig. 10 the shaft 55 which is adjusted under control of the "B" key extends to the right and has connected to it a rearwardly extending arm 113 (Fig. 11) which is connected to an operating segment 114 by a link 115. The segment 114 is loosely mounted upon the shaft 42 and the teeth of the segment mesh with a pinion 116 which is attached to a shaft 117 which shaft carries at one end a type segment 118 (see also Figs. 9 and 13) for printing either the letter A or the letter B upon the check. Normally the type carrier 118 is adjusted so that it will print the letter A, but whenever the B key is depressed the shaft 55 will be rocked and through the arm 113, link 115 and operating segment 114, the type carrier will be adjusted from a position for printing the letter A to a position wherein it will print the letter B upon the inserted slip or telegram.

Attached by means of a clamp to the sleeve 76 (Fig. 10) which it will be remembered, is differentially positioned by means of the "Errand" and "Cable" keys 21 and 22, respectively, is a rearwardly extending arm 119 (Fig. 1) to which is connected a link 120 which, in turn, is attached to a downward extension of a segmental rack 121 (Fig. 11) loosely mounted upon the shaft 42. The segment 121, as shown in Fig. 9, meshes with the teeth of a pinion 122 connected by a tube to a type carrier 123 having on its periphery type for printing characters to represent the different classes of transactions.

From what has previously been said, it would appear that only the keys 21 and 22 differentially adjust the sleeves 75 and 76. However, in order to print the characters "B" and "S" by means of the type carrier 123 (Fig. 9) in addition to the characters "E" and "C", the sleeve 75 has attached thereto cam plates 124 and 125 which are formed with cam slots co-operating with the studs 69 and 62 formed in their associated operating keys. The cam slots formed in the cam plates 124 and 125 of the machine shown are similar to but of different inclination, from the cam slots formed in the cam plates 70 and 64 respectively, so that a different extent of differential movement will be imparted to the sleeves 75 and 76 and through the connections described to the transaction type carrier 123 to print the characters B and S upon the inserted slip than is imparted to the element 68 for printing "B" and "S" on the record strip. This separate connection from the keys 23 and 24 is necessary since it will be remembered that the cam plates 64 and 70 are attached to the bail 65 and are not carried or attached to the sleeve 75. It is a matter of choice, however, as to whether the slots in the plates 124 and 125 are respectively the same as or different from the slots in the plates 70 and 64 so long as the plates 74, 72, 124 and 125 have slots of four different degrees of inclination.

In the machine shown the cam slots of the cam plates associated with each of the keys 23 and 24 are dis-similar so that if the "Book Message" key should be depressed the sleeve 75 and bail 65 would be moved different amounts and similarly the link 67 and segment 80 would be moved different extents to cause unequal rotative movements of the type members 68 and 81. In the present machine this unequal movement of the type members is brought about by having different types of connections between the cam plates and type members as well as by the difference in the inclination of the slots themselves.

The parts are so proportioned that when bail 65 is rocked by the "Book Message" key the printing segment 68 will be moved to bring the character "B" to the printing point but the segment 81 will be rocked to such an extent that both characters "E" and "C" are at a point distant from the printing line. The same result is effected when the "Special Rate" key is depressed, so that only the character "S" carried by the member 68 will be presented to the printing line while the characters "E" and "C" of member 81 are carried still farther away from the printing line. If it should be desired to provide the cam plates 124 and 125 with the same form of slots as the plates 70 and 64 respectively, it would merely be necessary to normally position the type member 81 so that letter "E" is three steps away from the printing line. Then depression of the "Book Message" and "Special Rate" keys would not be sufficient to bring any character of this member to the printing line.

*Consecutive numbering type carriers for slip printing mechanism*

As has been several times stated hereinbefore the slip printing mechanism is also provided with a series of consecutive numbering type carriers. These as shown in Fig. 9 are designated by reference character 126 and are loosely mounted upon a sleeve 127 overlying the shaft 117. Each type carrier has attached thereto a ratchet wheel 128, the teeth of which co-operate with a spring-pressed operating and carrying pawl 129 which is pivotally mounted upon a bail 130 by means of a pin 131. In order to oscillate the bail at each operation of the machine the driving shaft 38 carries a cam 132 which co-operates with rollers carried by a bell-crank 133 which bell-crank is bifurcated at its upper end to receive a pin 134 carried by a bent arm 135. The arm 135 is pinned to a short shaft 136 which shaft as shown in Figs. 2 and 8 has attached thereto an arm 137 bifurcated at its end to receive the pin 131.

By the train of mechanism just described the driving shaft 38 is adapted at each operation of the machine to add a unit to the numbering type carriers 126, and at this time, attention is directed to the fact, that since the consecutive numbering type carriers 82 associated with the record strip printing mechanism are synchronized with the consecutive numbering type carriers 126 associated with the slip printing mechanism the same items printed on the two record mediums will be identified by the same consecutive number.

*Printing hammer*

The impressions upon the slip are taken from the consecutive number, special character and item type carriers by a percussion hammer which is adapted to be actuated during each operation of the machine. As shown in Fig. 13, the hammer 140 for this purpose is loose upon a short shaft 141 and at its forward end the hammer carries an impression block 142 of rubber or suitable material and of sufficient length to take an impression from the assembly of type carriers illustrated in Fig. 9.

A printing movement is imparted to the impression hammer by an arm 143 which is pivotally mounted adjacent the hammer 140 and is likewise loose upon the stub shaft 141. The forward edge of the arm 143 carries a block or shoulder 144 in engagement with a stud 145 carried by the impression hammer 140. Below the shoulder 144 is a second block or shoulder 146 bearing against a fixed stud 147. At its lower end the arm 143 carries a lug 148 in the plane of rotation of a snail cam 149 fast to the driving shaft 38. During the rotation of the shaft 38 in the direction of the arrow shown in Fig. 13, the cam 149 will act on the lug 148 to swing the arm 143 rearwardly against the tension of a spring 150, connected to the arm 143, until the cam passes out of engagement with the lug whereupon the spring 150 will snap the arm 143 forwardly until it is arrested by the engagement of shoulder 146 with stud 147 while just previous to this the shoulder 144 on the arm 143 will strike the stud 145 carried by the hammer 140. As best shown in Fig. 13, the hammer normally rests with the stud 145 in engagement with the shoulder 144 of the impression hammer operating arm 143 and in this normal position the rubber impression block 142 carried by the hammer is at some distance from the type carriers. When the hammer operating arm 143 is forced rearwardly by the eccentric portion of the cam 149 the hammer will fall and when the cam releases the arm the hammer will be forcibly thrown against the type carriers to take an impression.

*Aligning mechanism for items and identifying type carriers*

The mechanism whereby the various differentially adjusted item and identifying type carriers are aligned so that the type will print along a straight horizontal line as shown in Fig. 11 includes aligning fingers 151 of which there is one provided for each adjusting pinion. These fingers are integral with a pawl carrying member 152 which is loosely mounted upon a shaft 158 and has attached thereto a rearwardly extending arm 153 carrying a pin 154 engaging a slot in the upper arm of a pivoted bell-crank 155. The bell-crank 155 is provided with a lug 156 adapted so co-operate with a cam provided with a high portion 157. The high portion of the cam is adapted at the proper time to engage the lug thereby rocking the bell-crank 155 clockwise as viewed in Fig. 11 and rocking the aligning fingers 151 downwardly into engagement with the interdental spaces of the pinions to suitably align the type carriers.

*Inking devices*

In order to ink the type carriers there is provided an inking ribbon which may be manually spaced or fed when desired by means of a spacing lever projecting through a slot in the slip printer hood. The inking ribbon 160, as shown in Fig. 13, is drawn from a storage spool 161 which is carried by a stud 162. The inking ribbon passes beneath a pair of sleeves 163 and 164, it being interposed between the rubber impression block 142 and the printing line of the type carriers. The ribbon is wound upon the receiving spool 165 which is carried by a fixed stud 166. Whenever the printing impressions became light the inking ribbon may be fed manually to present a fresh portion to the type carriers and to this end there is connected to the receiving spool 165 a ratchet wheel 167 (Fig. 11) in engagement with a feeding pawl 168 carried by a feeding lever 169 which projects through a slot 170 formed in the slip printer hood 171. A retrograde pawl 172 prevents any retrograde movement of the receiving roller and in order to retain the inking ribbon taut and prevent it from sagging there is provided at the supply roller a curved arm 173 (Fig. 13) one end of which has a sliding contact with the upper side of the sleeve 163 while the other end is urged by a spring 174 so that the curved portion of the arm 173 will engage a circular element attached to and movable with the storage spool 161 thereby acting as a brake for this member.

The slip printing mechanism is entirely concealed by the hood 171 which is rigidly attached to the cabinet proper and which has hinged thereto at its side a door 175 (Fig. 1). The slips or telegrams are inserted in a slot formed by suitably cutting away the printer hood 171 and the door 175, the record material resting upon a fixed platform 176 (Fig. 13) which is apertured so that the rubber impression block 142 may effect the printing impressions. The printer hood 171 is slotted at 177 (Fig. 1) at its rearward end so that long slips of paper may be inserted or drawn through the printing mechanism to be printed upon, but where the slips, such as telegrams, are of fixed dimensions they are placed upon a platform or table 178 the lower end resting against a stop lug 179, and the side against a lug 1791 (Fig. 15). As shown in the drawings the platform 178 is secured to the under side of the printer lid 1781 and is arranged so that it can be adjusted to accommodate slips of different dimensions. This is effected by means of the elongated slots 1780 in the platform co-operating with the securing screws. Engraved upon the door 175 on the side of the printer hood is an arrow designating the printing line.

*Resetting consecutive numbering wheels*

It is desirable that after both sets of consecutive numbering wheels consecutively number items pertaining to some arbitrary period that they be restored to zero in order to be ready to consecutively number the items pertaining to a subsequent period of business. To this end the illustrative machine is provided with a single lever which when reciprocated will zeroize both numbering counters.

As shown in Fig. 14, the resetting lever 182 is loosely mounted upon the shaft 42 and is provided with a pin 183 engaging a slot formed in a plate 184 securely attached to a sleeve 185 encircling the shaft 100. The sleeve 185 has attached thereto at substantially its mid-portion, as shown in Fig. 2, a downwardly extending arm 186 carrying a pin which is connected by a link 187 to an extension of a resetting segment 188. The teeth of the resetting segment 188 mesh with a pinion 189 securely attached to the sleeve 83 which, it will be remembered, is the supporting member for the consecutive numbering wheels 82. As shown in Fig. 6, each numbering wheel is provided with a resetting or turn-back pawl 190 the end of which is adapted to engage a square shouldered notch formed in the sleeve 83. In adding operations the numbering wheels 82 are adapted to be turned in a clockwise direction as viewed in Fig. 6 so that the resetting pawls 190 will merely ride around the periphery of the tube 83 dropping into and out of the slot formed in the tube. However, when the resetting lever is moved forwardly the resetting segment 188 will be moved rearwardly, and through the pinion 189 will rotate the sleeve 83 in a clockwise direction (Fig. 6). The shouldered notches formed in the sleeve will, at this time, engage the resetting pawls 190 of the variously positioned numbering wheels thereby restoring them to their normal or zero positions.

Advantage is taken of the movement of the sleeve 185 in resetting operations to simultaneously zeroize the consecutive numbering type carriers associated with the slip printing mechanism. As shown in Fig. 2 the sleeve 185 has rigidly secured thereto at its right end an upwardly extending arm 191 (Fig. 14) carrying a stud 192 engaging the slot formed in a downward extension of a resetting segment 193. The resetting segment 193 meshes with a gear 194 securely attached to the shaft 158. The shaft 158, as shown in Fig. 2, has secured thereto a pinion 195 meshing with a pinion 196 which is rigidly secured to the sleeve 127 which forms the supporting means for the consecutive numbering type carriers 126 (Fig. 8). All of the numbering type carriers 126 are provided with pawls similar to the pawls 190 and when the sleeve 127 is turned in a resetting operation the shoulders 198 formed therein will co-operate with the engaging ends of the resetting pawls thus picking up the variously positioned consecutive numbering wheels and restoring them to their normal or zero positions.

Locking devices for resetting lever

The machine disclosed in the Fuller application, Serial No. 263,125 to which the invention is applied, as well as the application to C. W. Green, Serial No. 639,569, filed May 17, 1923, is provided with a mechanism which controls the manner in which the machine is to be operated as well as for performing other functions, such as, locking the register, releasing the cash drawer, conditioning the machine for printing the totals and resetting the totalizers. This mechanism comprises an index 199 (Fig. 15) and a lock 200 under control of the proprietor and situated at the right hand end of the machine. When the lock is unlocked and the index set so that it is adjacent the words "Total and Reset" the machine is conditioned for total printing and resetting of the totalizers. Since it is also desirable at this time to reset the consecutive numbering counters heretofore mentioned, the present application incorporates mechanisms whereby this function may be performed when the lever is set to the proper position. Means for accomplishing this will now be explained in detail.

Loosely mounted upon the shaft 42 is an adjustable bell-crank 201 (Fig. 17) and secured to said bell-crank is a curved plate 202 which carries the pointer 199 movable over an index strip 203 securely attached to the cabinet. The lower arm of the bell-crank 201 is provided with a sector arm 204 carrying teeth. mounted loosely on the key shaft 26 is a gear sector 205 and secured to the gear sector 205 is a somewhat larger gear sector 206 meshing with a gear sector 207 secured to the right end of a shaft 208. From the foregoing it is evident that when the proprietor unlocks the lever and adjusts the index 199 to the "Total and reset" position, the shaft 208 will be rocked by the train of mechanism just described. The shaft 208 has secured thereto a cam disk 209 formed with a cam slot 210 in which registers a stud attached to a bell-crank 211. The upper end of the lever 211 is provided with a stud 212 which co-operates with a shoulder 213 of a latch member 214 (Fig. 11) carried by a front lid 216, the latch member having a hooked portion engaging a lug 215 carried by the cabinet 28. By means of this mechanism, it will be noted that when the control lever is adjusted to the "Total and reset" position the cam 209 on the shaft 54 will oscillate the bell-crank lever 211 thereby disabling the latch 214 for the lid 216 so that when the upper lid 1781 is elevated the front lid 216 may be rotated about its pivotal point to gain access to the mechanisms located within the machine. The lid 216 (Fig. 1) carries a stud 217 co-operating with a cam slot formed in a cam plate 218 rigidly secured to a shaft 219. Attached to the shaft 219 is a rearwardly extending arm 220 which, as shown in Fig. 14, is provided with a pin 222 normally engaging an extension of the resetting lever 182. Therefore, it will be noted that when the upper lid is elevated and the front lid rocked about its lower pivotal point the co-operation of the stud 217 with the slot of the cam plate 218 will rock the shaft 219 bringing the pin 222 out of locking co-operative relationship with the integral extension of the resetting lever 182. This will permit only the proprietor or any authorized persons having the key of the control mechanism to reset the consecutive numbering counters.

General summary of operation

The nature of the improved mechanism is such that in order to make the foregoing description as clear as possible it was necessary to state the operation considerably in detail as an incident to explaining the various features of construction. A complete re-statement here of the operation is therefore believed to be unnecessary. However, a résumé of the general operation of the machine will now be given to co-ordinate the operation and functions of the various parts which have been described in detail.

It will be assumed that clerk "A" has received a message, the charges on which are $8.10 and it is desired to register this amount in the machine. The written message is first inserted in the slot formed in the slip printer hood, the lower portion resting upon the platform 178 (Fig. 15) which, it will be assumed has previously been adjusted so that a printing impression will be effected upon the proper portion of the sheet.

To enter this transaction the appropriate keys in the dollars and dimes banks are simultaneously depressed together with the "A" clerk's key 25. When these keys are depressed the notches 33 (Fig. 1) in the rear ends of the keys engage the flange 32 of the key coupler 30 thereby elevating the key coupler. As the proper keys are depressed the rollers 40 of the depressed keys will work in the associated cam slots 46 formed in the plates 41 of the differential frames 430 related to the dollars bank, and 431 related to the dimes bank, and since the frames will each be differentially operated so as to move the corresponding racks 471 and 470 an amount commensurate with the depressed keys, these racks will simultaneously adjust the item printing type carriers 49 (Fig. 1) to their proper positions. At the same time through the connections previously described the dollars type carrier 105 and the dimes type carrier 110 (Fig. 9) of the slip printing mechanism will be adjusted. At a certain point in the operation of the machine the platen 51 will be operated so as to effect an impression from the type carriers 49 upon the record strip.

As the key coupler 30 is elevated the oppositely disposed sets of rack teeth 36 (Fig. 1) will alternately engage the teeth 37 attached to the main operating shaft thereby rotating the latter and as the shaft 38 is rotated the cam 149 (Fig. 13) will act on the lug 148 to swing the arm 143 rearwardly against the tension of the spring 150 until the cam passes out of engagement with the projection whereupon the spring 150 will snap the arm 143 forwardly until it is arrested by the stud 147 and the shoulder 144 on the arm will strike the stud 145 carried by the hammer 140 so that the hammer will be forcibly thrown against the type carriers to effect an impression upon the telegram.

It will be remembered that the type segment 61 (Fig. 4) is normally positioned so that when printing is effected by the platen 51 the character "A" will be printed upon the record strip, and (referring to Fig. 13) the clerk's type carrier 118 is normally positioned so as to print the letter "A" upon the inserted telegram.

It will be assumed that the consecutive numbering type carriers 126 (Fig. 9) associated with the slip printing mechanism and the consecutive numbering type carriers 82 associated with the record strip printing mechanism have previously been zeroized so that the same number stands upon both sets of numbering wheels which, in the present embodiment, comprises the number of the transactions entered subsequent to the last resetting. In the machine shown during the downward depression of the keys the cam 88 (Fig. 7) will oscillate the bell-crank 89 and through the link 91 will elevate the bail 85 which, through the operating pawl 87 will add a unit to the number type carriers 82 while simultaneously the bell-crank 133 (Fig. 8) will be rocked by its associated cam 132 and through the arm 135 will rock the shaft 136. Rocking of the shaft 136 will effect an upward movement of the arm 137 and since the pawls 129 are in co-operation with the ratchet teeth 128 a unit will also be added to the consecutive numbering type carriers 126. When the platens associated with the record strip printing mechanism and slip printing mechanism are subsequently operated in the same cycle of operation of the machine the same consecutive number will be printed upon the respective record materials.

In the event that the next transaction should be one entered by clerk "B" the keys representing the desired amount will be depressed simultaneously with the clerk's key "B", and in this instance, the pin 58 (Fig. 16) carried by the B key 25 (Fig. 10) will enter the cam slot 57 and by means of the cam plate 56 will rock the shaft 55. Rocking of the shaft 55 will draw the arm 59 (Fig. 10) downwardly and through the link 60 (Figs. 4 and 11) will adjust the printing segment 61 so that the character "B" will be presented to the printing point. The shaft 54 will also draw the arm 113 (Fig. 11) downwardly and through the link 115 connected to the segment 114 will adjust the latter so that by means of the gear 116 (Fig. 9) the type carrier 118 will be adjusted to present the letter "B" at the printing point of the slip printing mechanism. Therefore, in this case the letter "B" will be printed instead of the letter "A". In the operations above explained it was assumed that the message which was handled by the operator was a straight telegram. If the transaction entered should be one necessitating the depression of either the "Errand" key 21 or the "Cable" key 22 the appropriate one of these keys would be depressed in conjunction with the desired clerks' key and amount keys. When either of these keys is depressed the sleeve 76 (Fig. 10) will be rocked and through the arm 77 and segment 80 (Fig. 5) the type carrier 81 will be brought to such a position that the corresponding character "E" or "C" will be printed upon the record strip depending upon which key has been depressed. The rocking of the sleeve 76 will, through the arm 119 (Fig. 1) draw the link 120 downwardly and by means of the segment 121 (Figs. 9 and 11) the gear 122 will be adjusted so that through its connecting sleeve it will set the type carrier 123 to print either the character "E" or "C" upon the inserted record material.

So also when a transaction involves the depression of the "Book Message" key 23 the latter is depressed simultaneously with the clerk's and amount keys. When the key 23 is depressed the pin 69 (Fig. 10) carried thereby will work in the cam slots formed in the cam plates 70 and 124. This will adjust the bail 65 and through the link 67 will adjust the type printing member 68 (Fig. 3) to such a position that the character "B" will be presented to the printing line and when the platen 51 is operated the character "B" will be printed upon the record strip at a point at some distance from the other printed data (see Fig. 15). Simultaneously the sleeve 76 will be rocked so that the arm 77 will be drawn downwardly thereby adjusting the segment 80 (Fig. 5) but to such an extent that the printing member 81 will be brought to a position wherein neither of the characters "E" or "C" will be in range of the platen 51. However, adjustment of the sleeve 76 will, through the arm 119 and link 120 adjust the segment 121 (Fig. 9) so that through the gear 122 and connecting sleeve the type member 123 will be adjusted to bring the character "B" in the range of the slip printing platen 142.

When the "Special Rate" key 24 is depressed the sleeve 75 and bail member 65 will be rocked in a manner similar to when the "Book Message" key is depressed but to different extents so that while the type printing member 68 (Fig. 3) is adjusted to bring the character "S" to the printing line the printing member 81 is adjusted to such an extent that neither of the characters "E" or "C" will be printed when the platen 51 is operated. However, the type member 123 (Fig. 9) will be adjusted so that the latter will print the character "S" upon the inserted slip.

In order to consecutively number the items pertaining to each arbitrary period of business the resetting lever 182 (Fig. 14) is reciprocated at the end of a period so that both sets of consecutive numbering wheels will be zeroized for the commencement of a new period. However, before this is possible the control lever lock 200 (Fig. 15) must be adjusted so that the index 199 is opposite the words "Total and Reset".

When the control lever is moved to this position the gear sector arm 204 will rotate the gear 205 and through the gears 206, 207 the shaft 208 will be rocked. Through the cam disk 209 this will result in rocking the lever 211 so as to disable the lid latch 214. This will permit the rocking of the lid 216 about its pivotal point after the lid 1781 is elevated. As the lid 216 is rocked the stud 217 co-operating with the cam 218 will rock the shaft 219 bringing the pin 222 of arm 220 out of locking co-operative relationship with the resetting lever 182 thereby unlocking the latter for operation.

When the resetting lever 182 is drawn forwardly the resetting segment 188 will be moved rearwardly and through the pinion 189 will rotate the sleeve 83 in a clockwise direction so that the slot formed in the sleeve will engage the resetting pawls 190 (Fig. 6) of the variously positioned numbering wheels 82 and restore them to their normal or zero positions. Simultaneously the resetting segment 193 (Fig. 14) is moved downwardly and through the train of mechanism previously described, the sleeve 127 will be turned so that the shoulders 198 formed therein will co-operate with the engaging end of the resetting pawls to pick up the variously positioned consecutive numbering wheels 126 and restore them to their normal or zero positions.

While the form of mechanism herein described is admirably adapted to fulfill the objects primarily stated, it is to be understood that it is not intended to confine the invention to the one form of embodiment shown, since it may be embodied in various forms, all coming within the scope of the claims which follow.

What is claimed is:

1. In a machine of the class described, a plurality of printing units adapted to print upon separate record media, a consecutive number printing device associated with each of said units, said devices each comprising a plurality of type elements mounted upon a shaft, and adapted to print corresponding consecutive numbers, a reset lever connected to rotate said shafts simultaneously, thereby to reset said type elements to zero at substantially the same time, and lock controlled means for preventing unauthorized operation of said resetting lever.

2. In a machine of the class described, the combination of a plurality of special type carriers for printing identifying characters on a plurality of record media, a plurality of special keys, a set of cam plates correlated with each special type carrier, and means carried by each key co-operating with a cam plate of each set.

3. In a machine of the class described, the combination of a plurality of special type carriers for printing identifying characters upon a record strip, a cam plate for adjusting each type carrier and a special key co-operating with a plurality of cam plates whereby both type carriers are adjusted upon an operation of the special key.

4. In a machine of the class described, the combination of a plurality of special type carriers for printing identifying characters upon a record strip, a cam plate for adjusting each type carrier, a special key co-operating with a plurality of cam plates whereby both type carriers are adjusted upon an operation of the special key, and connecting mechanism between the cam plates and type carriers so arranged that upon movement of the cam plates by a depression of the special key different movements will be imparted to the two type carriers.

5. In a machine of the class described, the combination of a plurality of special type carriers laterally separated for printing identifying characters upon a record strip in such a manner that certain characters are readily distinguished from others, a cam plate for adjusting each type carrier, a special key co-operating with a plurality of cam plates whereby both type carriers are adjusted upon an operation of the special key, and connecting mechanism between the cam plates and type carriers so arranged that upon movement of the cam plates by a depression of the special key different movements will be imparted to the two type carriers.

6. In a machine of the class described, a plurality of keys arranged in groups, two separate printing units, comprising type carriers, means whereby all of said keys control the adjustment of a single type carrier in one of said units, and means whereby each group of keys controls a separate type carrier in the other unit.

7. In a machine of the class described, a plurality of printing units, including type carriers, a plurality of keys for controlling the printing of special characters by said units, and means whereby said keys control a single type carrier in one of said units and a plurality of type carriers in another of said units.

8. In a machine of the class described, a plurality of printing units, including type carriers, a plurality of keys for controlling the printing of special characters by said units, and means whereby said keys control a single type carrier in one of said units and a plurality of type carriers in another of said units, said plurality of type carriers associated with the second mentioned unit being laterally separated to render the characters readily distinguishable.

9. In a machine of the class described, a plurality of printing units each adapted to print special characters, a plurality of special keys for controlling the printing of said characters, and means whereby said characters are all printed in a single column by one of said printing units but in a plurality of columns by another of said units during successive operations of the machine.

10. In a machine of the class described, a cabinet, a stationary printing mechanism within said cabinet, a table adjacent said printing mechanism adapted to support a record medium, an opening in said cabinet above said table providing three open sides to permit the insertion of a record medium of indefinite size to receive an imprint, and a marker adjacent said opening which is so arranged as to be visible at all times regardless of the position of said slip with respect to the type carriers.

11. In a machine of the class described, a printing unit, a cabinet provided with a hood to conceal said printing unit, said hood being slotted on three sides to permit the free insertion of a record medium, a curved plate for guiding the record medium through one opening and a record medium supporting table adjacent said hood, said table being provided with adjustable record medium position determining means.

12. In a machine of the class described, a stationary printing unit, a cabinet normally concealing said unit, and an opening in said cabinet permitting the insertion of record material to be printed upon, said opening permitting the insertion of material of indefinite size to receive printing at any point adjacent an edge, said hood having a marker for indicating the printing point.

13. In a machine of the class described, a plurality of printing units for printing duplicate data on inserted slips and a record strip, a plurality of groups of keys, a shaft, a sleeve loosely mounted on said shaft, a second sleeve loosely mounted on said shaft and connected to said first mentioned sleeve, a bail loosely mounted on said first mentioned sleeve, connections leading from said shaft and from said second mentioned sleeve for preparing certain type carriers in all of said printing units for printing, and connections from said bail member to one of said printing units for preparing a certain type carrier therein for printing.

14. In a machine of the class described, a plurality of printing units, a plurality of transaction keys, a shaft, a plurality of axial aligned sleeves loosely embracing said shaft, a bail loosely mounted on one of said sleeves, connections between one of said sleeves and the printing units for preparing certain type carriers for printing, differential means connecting another sleeve to all of said keys, differential means connecting the said bail to some of the keys and means connecting the said sleeves for simultaneous movement.

15. In a device of the class described, a plurality of groups of transaction keys, a plurality of printing units for printing duplicate data on different record materials, a shaft, a sleeve mounted loosely on said shaft, a bail member loosely mounted on said sleeve, a group of cam plates fastened to said sleeve, another group of cam plates loosely mounted on said sleeve and fastened to said bail member, means carried by all of said keys for actuating the first mentioned group of cam plates, similar means carried by one of said groups of keys for actuating the second group of cam plates, connections between the said sleeve member and printing units for setting type carrying means in both printing units, and means connected to said bail for setting type carrying means in one of said printing units.

16. In a device of the class described, a plurality of printing units for printing on inserted slips and upon a record strip, a plurality of transaction keys, a shaft, a plurality of sleeve members mounted on said shaft in axial alignment, means connecting the two sleeves, connections leading from one of said sleeve members to the various printing units, and connections leading from another sleeve member to the said keys including a differential mechanism for causing variable movements to occur to said sleeves upon depression of the said key members.

17. In a machine of the class described, a plurality of printing units for printing duplicate data on different record materials, comprising in combination a plurality of transaction keys, a shaft, a sleeve member loosely mounted on said shaft, a group of cam plates having cam slots of variable degrees of inclination mounted on said sleeve, a second sleeve member mounted loosely on said shaft, a bail connecting the two sleeve members, means carried by each of said key members for actuating said cam members and consequently the said sleeve members a predetermined degree, a second group of cam members mounted loosely on said first mentioned sleeve, a bail member connected with said second group of cam members and adapted to be swung thereby, connections between said second group of cam members and some of the said keys, means connecting said second mentioned bail member to type carriers in one unit for registering certain types of transactions, means connecting said second mentioned sleeve member to the type carriers in both of said printing units for registering certain types of transactions in both of said printing units.

CHARLES W. GREEN.